(12) United States Patent
Hammoud

(10) Patent No.: US 7,331,671 B2
(45) Date of Patent: Feb. 19, 2008

(54) EYE TRACKING METHOD BASED ON CORRELATION AND DETECTED EYE MOVEMENT

(75) Inventor: Riad I. Hammoud, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 670 days.

(21) Appl. No.: 10/813,192

(22) Filed: Mar. 29, 2004

(65) Prior Publication Data

US 2005/0213792 A1    Sep. 29, 2005

(51) Int. Cl.
*A61B 3/14*   (2006.01)
*A61B 3/00*   (2006.01)

(52) U.S. Cl. ...................... 351/210; 351/200
(58) Field of Classification Search ............... 351/205, 351/208–210
See application file for complete search history.

(56) References Cited

U.S. PATENT DOCUMENTS

| | | | |
|---|---|---|---|
| 4,973,149 A * | 11/1990 | Hutchinson ................. 351/210 |
| 5,481,622 A * | 1/1996 | Gerhardt et al. ............. 382/103 |
| 5,795,306 A | 8/1998 | Shimotani et al. .......... 600/558 |
| RE36,041 E | 1/1999 | Turk et al. ................... 382/118 |
| 5,859,686 A * | 1/1999 | Aboutalib et al. .......... 351/209 |
| 5,878,156 A | 3/1999 | Okumura ..................... 382/118 |
| 5,926,251 A | 7/1999 | Okumura ..................... 351/209 |
| 6,097,295 A | 8/2000 | Griesinger et al. ......... 340/576 |
| 6,130,617 A | 10/2000 | Yeo ............................. 340/575 |
| 6,243,015 B1 | 6/2001 | Yeo ............................. 340/576 |
| 6,304,187 B1 | 10/2001 | Pirim .......................... 340/576 |
| 6,571,002 B1 * | 5/2003 | Ogawa ....................... 382/117 |
| 7,044,602 B2 * | 5/2006 | Chernyak ................... 351/208 |
| 2003/0118217 A1 * | 6/2003 | Kondo et al. ................ 382/117 |
| 2004/0196433 A1 * | 10/2004 | Durnell ....................... 351/209 |

* cited by examiner

*Primary Examiner*—Scott J Sugarman
*Assistant Examiner*—DaWayne A Pinkney
(74) *Attorney, Agent, or Firm*—Jimmy L. Funke

(57) ABSTRACT

An eye tracking method tracks a subject's eye template by correlation between successive video frames, and periodically updates the eye template based on detected characteristic eye or eyelid movement such as blinking, eyelash movement and iris movement. In the absence of eyelid motion detection, a state vector corresponding to the center of the subject's eye is determined by a correlation technique, and when eyelid motion is detected, the state vector is determined based on the location of the detected motion.

6 Claims, 5 Drawing Sheets

EYE TRACKING METHOD BASED ON CORRELATION AND DETECTED EYE MOVEMENT

TECHNICAL FIELD

The present invention relates to an eye tracking method that determines the location a subject's eye in a video image by correlation, and more particularly to a method of periodically updating the determined eye location based on detected characteristic eye movement.

BACKGROUND OF THE INVENTION

Vision systems frequently entail locating and tracking a subject's eye in an image generated by a video camera. In the motor vehicle environment, for example, a camera can be used to generate an image of the driver's face, and portions of the image corresponding to the driver's eyes can be analyzed to assess drive gaze or drowsiness. See, for example, the U.S. Pat. Nos. 5,795,306; 5,878,156; 5,926,251; 6,097,295; 6,130,617; 6,243,015; 6,304,187; and 6,571,002, incorporated herein by reference. While eye location and tracking algorithms can work reasonably well in a controlled environment, they tend to perform poorly under real world imaging conditions, particularly in systems having only one camera. For example, the ambient illumination can change dramatically, the subject may be wearing eyeglasses or sunglasses, and the subject's head can be rotated in a way that partially or fully obscures the eye.

Tracking eye movement from one video frame to the next is generally achieved using a correlation technique in which the eye template (i.e., a cluster of pixels corresponding to the subject's eye) of the previous frame is compared to different portions of a search window within the current frame. Correlation values are computed for each comparison, and the peak correlation value is used to identify the eye template in the current frame. While this technique is useful, the accuracy of the eye template tends to degenerate over time due to drift and conditions such as out-of-plane rotation of the subject's head, noise and changes in the eye appearance (due to glasses, for example). At some point, the eye template will be sufficiently degenerated that the system must enter a recovery mode in which the entire image is analyzed to re-locate the subject's eye.

SUMMARY OF THE INVENTION

The present invention is directed to an improved eye tracking method that tracks a subject's eye template by correlation between successive video frames, where the eye template is periodically updated based on detected characteristic eye or eyelid movement such as blinking, eyelash movement and iris movement. In the absence of eyelid motion detection, a state vector corresponding to the center of the subject's eye is determined by an improved correlation method; when eyelid motion is detected, the state vector is determined based on the location of the motion.

BRIEF DESCRIPTION OF THE DRAWINGS

The present invention will now be described, by way of example, with reference to the accompanying drawings, in which.

DESCRIPTION OF THE PREFERRED EMBODIMENT

The eye tracking method of the present invention is disclosed in the context of a system that monitors a driver of a motor vehicle. However, it will be recognized that the method of this invention is equally applicable to other vision systems, whether vehicular or non-vehicular.

Figure 1:
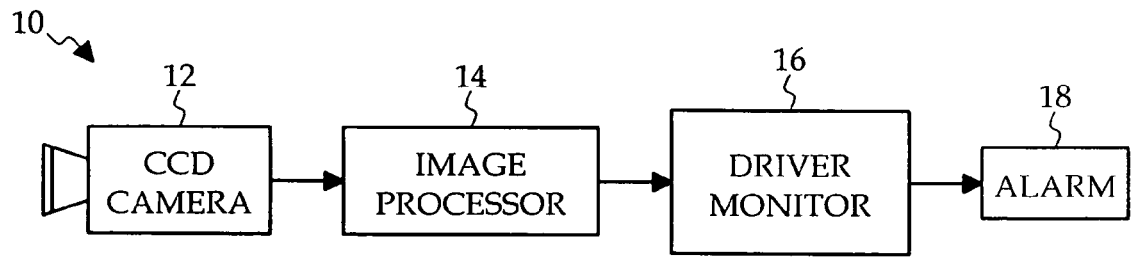
FIG. 1 is a block diagram of a motor vehicle vision system including a video camera and a microprocessor-based image processor for monitoring driver alertness.

Referring to the drawings, and particularly to FIG. 1, the reference numeral 10 generally designates a motor vehicle vision system for monitoring driver alertness. The system 10 includes a CCD camera 12, a microprocessor-based image processor 14, a driver monitor 16, and an alarm 18. The camera 12 is mounted in a convenient location within the vehicle passenger compartment, such as in a center console or instrument panel, and is configured to produce an unobstructed image of the driver's head, taking into account differences in driver height and orientation. The image processor 14 captures a stream of video frames or images (IMAGE$_{t-1}$, IMAGE$_t$, etc.) produced by camera 12, and executes software routines for identifying a state vector (S$_{t-1}$, S$_t$, etc.) corresponding to center of the driver's eye in each image, and tracking eye movement between successive video images. The driver monitor 16 receives the driver eye information from image processor 14, detects eye movement characteristic of driver drowsiness and/or distraction, and activates the alarm 18 or other safety alert when it is determined that the driver's lack of alertness or attention may possibly compromise vehicle safety.

Figure 2:
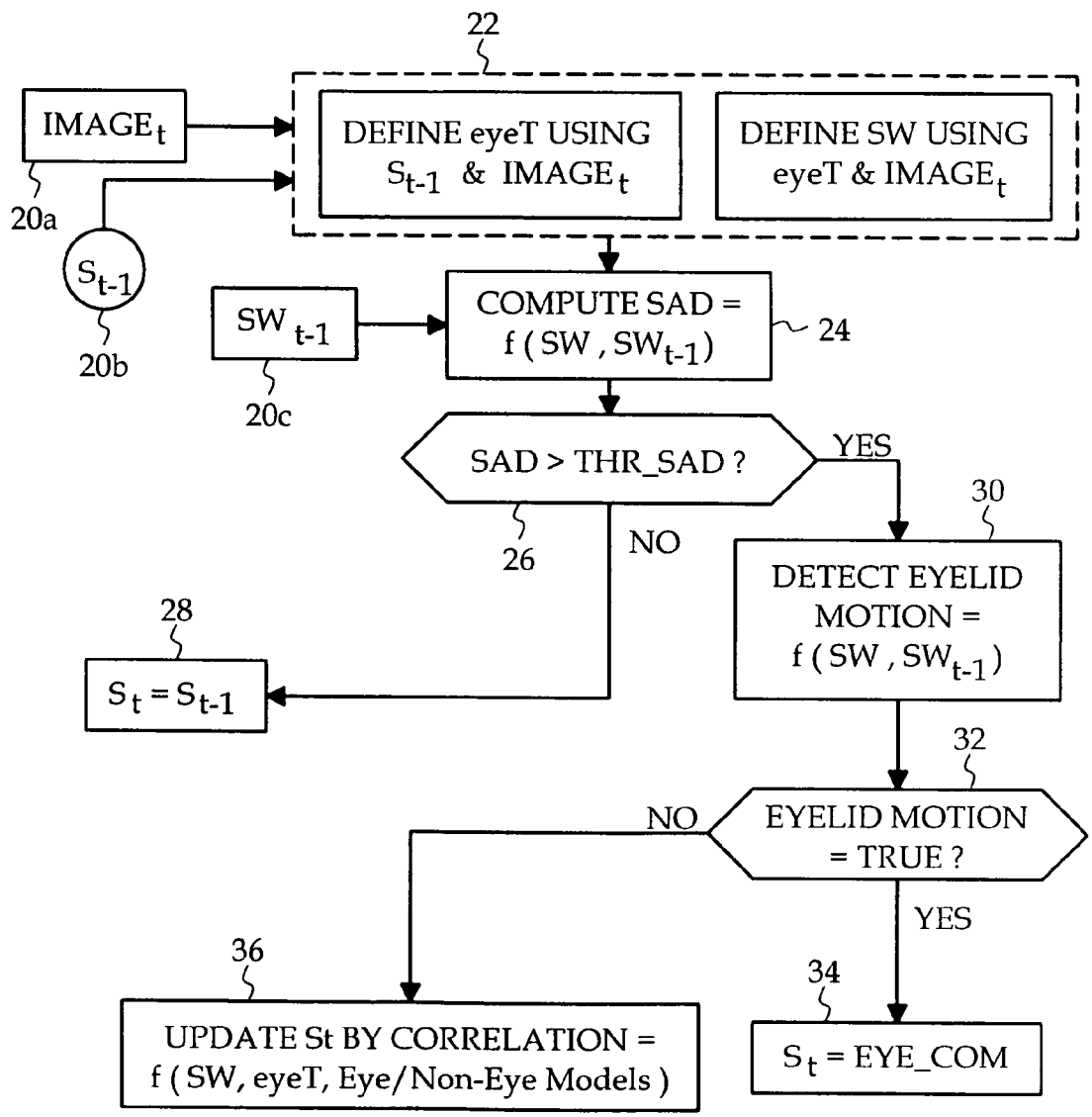
FIG. 2 is a flow diagram depicting a software routine executed by the image processor of FIG. 1 for carrying out the eye tracking method of this invention.

The flow diagram of FIG. 2 depicts a software routine executed by the image processor 14 according to this invention. Inputs 20a, 20b and 20c to the routine include the current video image (IMAGE$_t$), and the state vector S$_{t-1}$ and search window SW$_{t-1}$ for the previous video image (IMAGE$_{t-1}$). The block 22 designates a set of instructions for defining a portion of the current image (referred to herein as a search window SW) that should include the driver's eye, even with driver movement between IMAGE$_{t-1}$ and IMAGE$_t$. This is achieved by defining the coordinates of an eye template (eyeT)—that is, a small set of pixels that encompass primarily just the driver's eye—based on the state vector S$_{t-1}$, for IMAGE$_{t-1}$, applying the coordinates of eyeT to IMAGE$_t$, and defining the search window SW as a larger portion of IMAGE, that includes both eyeT and a set of pixels surrounding eyeT.

The block 24 then carries out a sum-of-absolute-differences (SAD) computation on the search window SW for the current image IMAGE$_t$ and the search window SW$_{t-1}$ for the previous image IMAGE$_{t-1}$. The SAD computation is essentially a pixel-by-pixel comparison of SW and SW$_{t-1}$, and provides a fast and reliable measure of the driver movement between the successive images IMAGE$_{t-1}$, and IMAGE$_t$. The block 26 compares the computed SAD value to a predefined threshold THR_SAD. If SAD<=THR_SAD, there is inconsequential driver movement between the images $IMAGE_{t-1}$ and $IMAGE_t$, and the block 28 sets the state vector $S_t$ for the current image $IMAGE_t$ equal to the state vector $S_{t-1}$ for the previous image $IMAGE_{t-1}$. If SAD>THR_SAD, there is significant driver movement between the images $IMAGE_{t-1}$ and $IMAGE_t$, and the block 30 is executed to detect if the differences between SW and $SW_{t-1}$ include driver eyelid motion. As described below in reference to the flow diagram of FIGS. 3A-3B, the eyelid motion detection technique identifies various candidate regions of the difference image, and sets the state of an EYELID MOTION flag to TRUE if at least one of the candidate regions is validated as eye motion. If the EYELID MOTION flag is TRUE, as determined at block 32, the block 34 sets the state vector $S_t$ for the current image $IMAGE_t$ equal to the eye center-of-movement EYE_COM (i.e., the centroid) of the validated candidate region. If the EYELID MOTION flag is not TRUE, the block 36 updates the state vector St using a correlation technique described below in reference to the flow diagram of FIGS. 5A-5B.

Figure 3A:
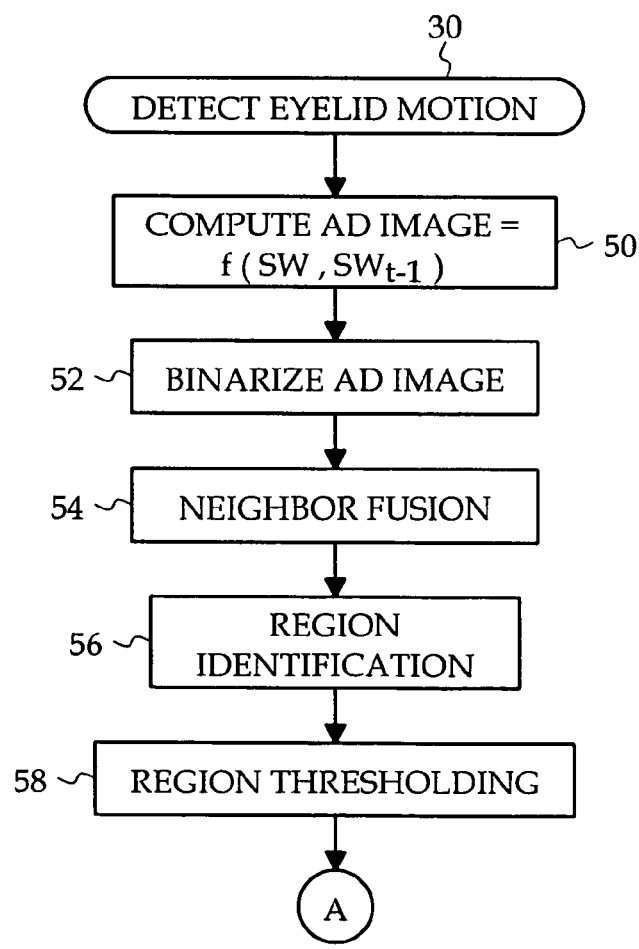
FIGS. 3A-3B together depict a flow diagram detailing a portion of the flow diagram of FIG. 2 pertaining to eyelid motion detection.
Figure 3B:
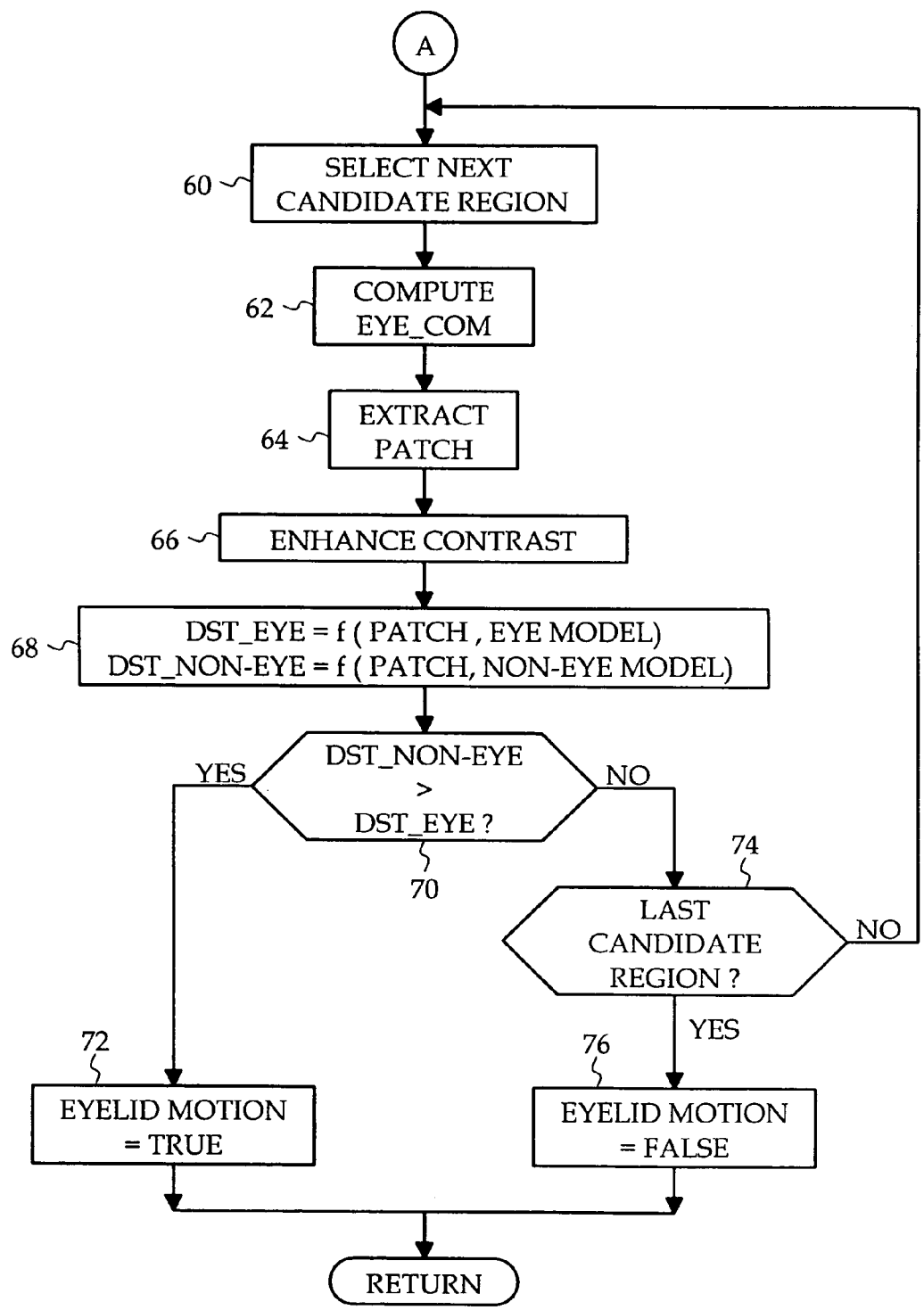

As indicated above, the flow diagram of FIGS. 3A-3B details block 30 of FIG. 2. Referring to FIGS. 3A-3B, eyelid motion detection is initiated at block 50 by creating an absolute-difference image (AD IMAGE) based on pixel-by-pixel magnitude differences between the search window SW of the current image $IMAGE_t$ and the search window $SW_{t-1}$ of the previous image $IMAGE_{t-1}$. The block 52 then binarizes the AD IMAGE using a calibrated or adaptive threshold, essentially converting the grey-scale AD IMAGE to a binary image. The blocks 54 and 56 then process the binarized image to fuse neighboring like-value pixels, and identify regions or pixel blobs that potentially correspond to facial features of interest. The block 58 employs window thresholding to select the identified regions that are size-wise consistent with facial features, such regions being referred to herein as candidate regions.

The blocks 60-76 are then executed for each of the candidate regions identified at block 58 to determine which, if any, of them corresponds to the driver's eye. In general, this is achieved by comparing each candidate region with a stored database or model that defines two categories of possible shapes: eye or non-eye. If the candidate region is more like the eye category than the non-eye category, it is accepted for purposes of eyelid movement detection; otherwise, it is rejected.

First, the block 60 selects a candidate region. The block 62 identifies the eye center-of-movement, or EYE_COM, according to the centroid of the selected candidate region, and the block 64 extracts a patch or block of pixels from the search window SW surrounding EYE_COM. The block 66 enhances the contrast of the extracted patch using a known contrast-enhancing transfer function, and the block 68 applies the contrast-enhanced patch to the eye and non-eye models. This involves computing an effective distance or deviation DST_EYE between the respective patch and the eye model, and an effective distance or deviation DST_NON-EYE between the respective patch and the non-eye model. If DST_NON-EYE is greater than DST_EYE, as determined at block 70, the candidate region is accepted for purposes of eyelid movement detection; in this case, the block 72 sets the EYELID MOTION flag to TRUE, completing the eyelid motion detection routine. If DST_NON-EYE is less than or equal to DST_EYE, the candidate region is rejected for purposes of eyelid movement detection and the block 74 is executed to determine if the selected candidate region was the last of the identified regions. If not, the block 60 selects the next candidate region, and the blocks 62-70 are repeated for the selected region. If none of the candidate regions are accepted for purposes of eyelid motion detection, the block 74 will eventually be answered in the affirmative, whereafter block 76 sets the EYELID MOTION flag to FALSE, completing the eyelid motion detection routine.

Figure 5A:
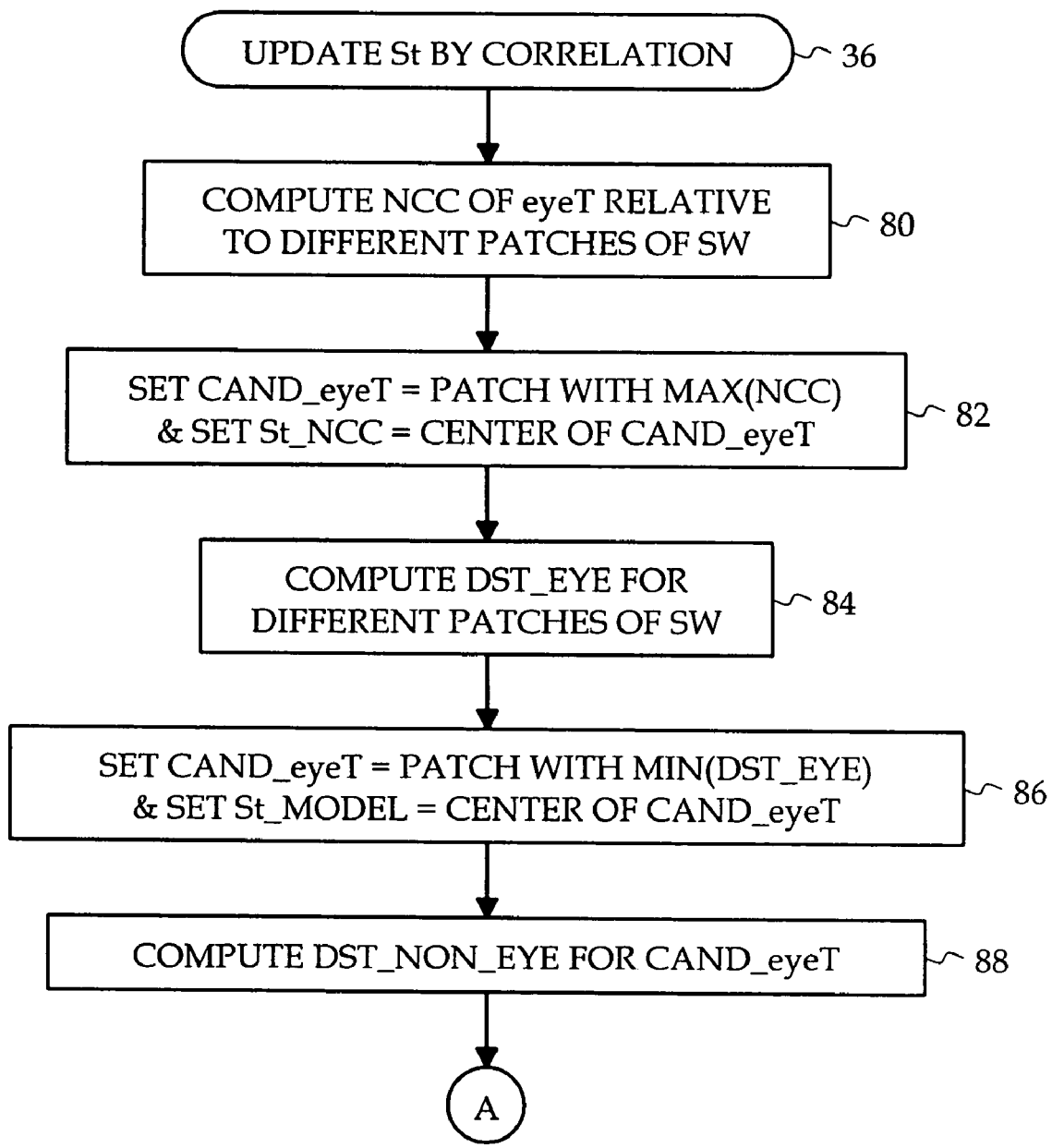
FIGS. 5A-5B together depict a flow diagram detailing a portion of the flow diagram of FIG. 2 pertaining to a correlation method of this invention.
Figure 5B:
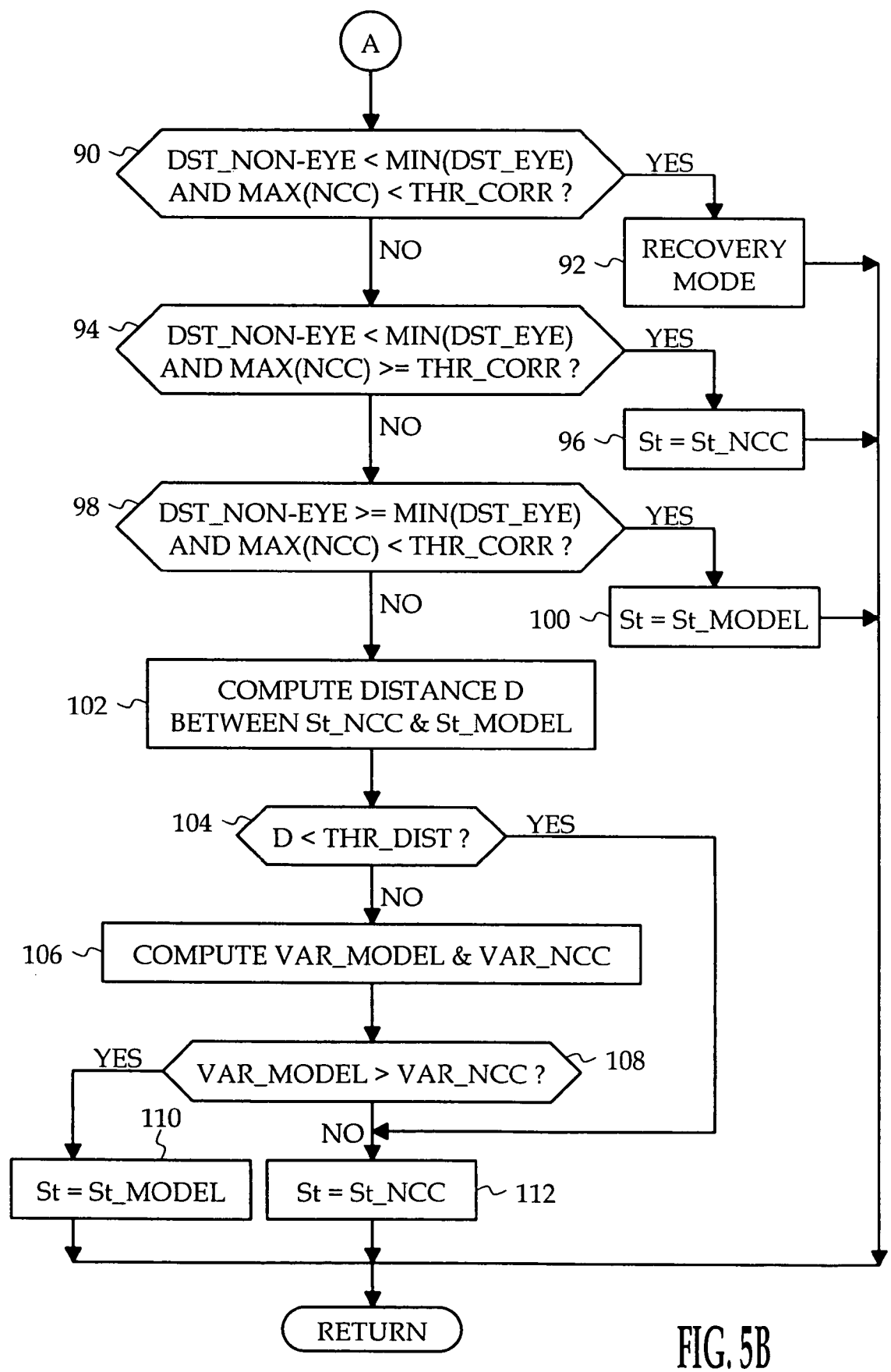

As indicated above, the flow diagram of FIGS. 5A-5B details block 36 of FIG. 2. In general, the block 36 carries out two different correlation techniques to identify the location of the driver's eye in the current video frame, and updates the state vector $S_t$ based on the correlation result that is deemed to be most reliable.

Figure 4:
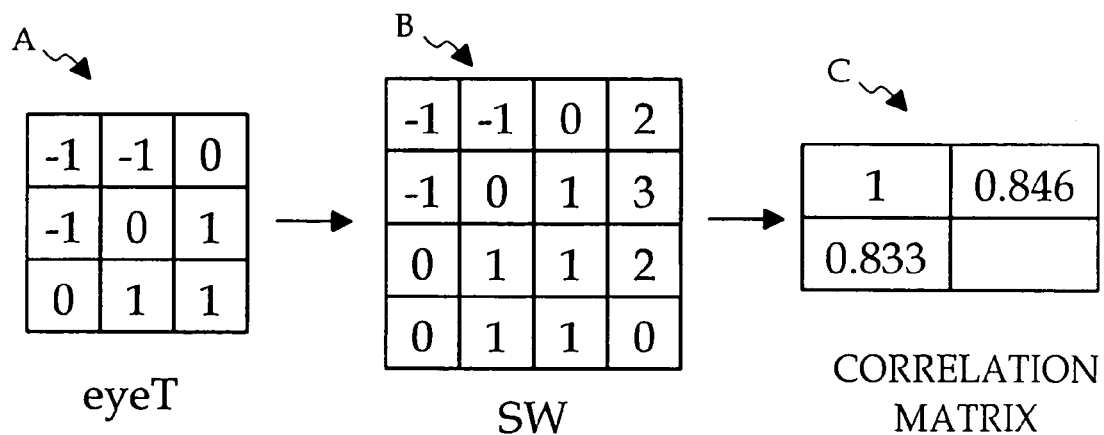
FIG. 4 is a diagram illustrating a portion of the flow diagram of FIG. 2 pertaining to a correlation technique for tracking eye movement in successive video frames.

The first correlation technique is generally known in the art as normalized cross-correlation (NCC), and involves comparing the eye template eyeT defined at block 22 of FIG. 2 with various pixel combinations of the search window SW. A normalized cross-correlation is illustrated in FIG. 4, where the letters A, B and C respectively designate the eye template eyeT, the search window SW and the resulting correlation matrix. The numerical values within the eyeT and SW arrays represent illumination magnitudes for individual respective pixels of the image $IMAGE_t$. In the example of FIG. 4, the pixels of eyeT are compared to three different sets of pixels within SW, producing the three correlation values designated by the letter C. In this case, the set of pixels in the upper left portion of SW correspond exactly to the pixels of eyeT, resulting in a maximum correlation value of one.

Referring to FIG. 5A, the block 80 computes NCC values for various search window patches, and the block 82 identifies the patch having the highest correlation value, or MAX(NCC), as the candidate eye template CAND_eyeT. The block 82 also stores the center of the patch CAND_eyeT as the NCC-based state vector variable St_NCC.

The second correlation technique utilizes the eye and non-eye models described above in reference to block 68 of FIG. 3B. Referring to FIG. 5A, the block 84 compares various patches of the search window SW to the eye model and computes an effective distance or deviation DST_EYE for each. The block 86 identifies the patch having the smallest distance, or MIN(DST_EYE), as the candidate eye template CAND_eyeT and stores the center of the patch CAND_eyeT as the model-based state vector variable St_MODEL. Finally, the block 88 compares the candidate eye template CAND_eyeT to the non-eye model and computes an effective distance or deviation DST_NON-EYE.

Referring to FIG. 5B, the blocks 90-112 are then executed to assess the correlation results and to update the state vector $S_t$ accordingly. If both correlation techniques fail to reliably identify the driver's eye, as determined at block 90, the block 92 is executed to enter a recovery mode in which IMAGE, is re-analyzed to locate the driver's eye. The model-based correlation technique is considered to be unsuccessful if DST_NON-EYE<MIN(DST_EYE); and the NCC-based correlation technique is considered to be unsuccessful if MAX(NCC) is less than a threshold correlation THR_CORR. If the model-based correlation technique is deemed unsuccessful (i.e., DST_NON-EYE<MIN(DST_EYE)) but the NCC-based correlation technique is successful (i.e., MAX(NCC)>=THR_CORR), the block 94 is answered in the affirmative and block 96 sets the state vector $S_t$ equal to the NCC-based state vector variable St_NCC. If the NCC-based correlation technique is deemed unsuccessful (i.e., MAX(NCC)<THR_CORR), but the model-based correlation technique is successful (i.e., DST_NON-EYE>=MIN(DST_EYE)), the block 98 is answered in the affirmative and block 100 sets the state vector $S_t$ equal to the model-based state vector variable St_MODEL.

If blocks 90, 94 and 98 are all answered in the negative, both the model-based correlation technique and the NCC-based correlation technique are deemed successful, and the blocks 102-112 are executed to update the state vector $S_t$ based on the more reliable of St_NCC and St_MODEL. The block 102 computes the Euclidian distance D between St_NCC and St_MODEL. If the distance D is less than a threshold THR_DIST as determined at block 104, the state vector $S_t$ may be set equal to either St_NCC or St_MODEL, whichever is most convenient (in the illustrated embodiment, $S_t$ is set equal to St_NCC). If D>=THR_DIST, the block 106 computes the variance of search window patches surrounding the state vector variables St_NCC and St_MODEL. The variance VAR_NCC corresponds to the state vector variable St_NCC, and the variance VAR_MODEL corresponds to the state vector variable St_MODEL. If VAR_MODEL>VAR_NCC, the model-based correlation technique is considered to be more reliable, and the blocks 108 and 110 set the state vector $S_t$ equal to St_MODEL. Otherwise, the NCC-based correlation technique is considered to be more reliable, and block 112 sets the state vector $S_t$ equal to St_NCC.

In summary, the method of the present invention uses eyelid motion detection to overcome the inherent disadvantages of conventional correlation-based eye tracking, resulting in a method that is robust, even in the presence of out-of-plane rotation of the driver's head, varying distances between the driver and the camera, different orientations of the driver's head, and changes in ambient illumination. While the method of the present invention has been described in reference to the illustrated embodiment, it will be recognized that various modifications in addition to those mentioned above will occur to those skilled in the art. For example, correlation calculations other than a normalized cross-correlation may be utilized, and so on. Accordingly, it will be understood that methods incorporating these and other modifications may fall within the scope of this invention, which is defined by the appended claims.

The invention claimed is:

1. A method of tracking movement of a subject's eye between first and second successively generated video images after a position of the subject's eye in said first video image has been identified, comprising the steps of:

defining a state vector for the first video image corresponding to the identified position of the subject's eye;

defining an eye template in said second video image based on said state vector, and defining a search window comprising said eye template and a portion of the second video image surrounding said eye template;

forming a difference image corresponding to differences between said search window and a corresponding portion of said first video image;

identifying at least one eye movement candidate region in the difference image;

determining a centroid of the eye movement candidate region and extracting a patch from the search window based on the determined centroid;

when the extracted search window patch has the appearance of an eye, identifying eyelid motion between the first and second video images and updating the state vector for the second video image according to the determined centroid; and when the extracted search window patch does not have the appearance of an eye, identifying a lack of eyelid motion between the first and second video images, and updating the state vector for the second video image according to the following steps:

computing correlation values based on a comparison of said eye template with different regions of said search window, and selecting a first region for which the computed correlation value is highest;

establishing an eye model defining image characteristics of the subject's eye and a non-eye model defining image characteristics of facial features other than the subject's eye;

computing deviations of the search window regions from said eye model, and selecting a second region for which the computed deviation is lowest;

updating the state vector for the second video image according to a center of the first selected region if said first selected region is determined to be more reliable than said second selected region; and updating the state vector for the second video image according to a center of the second selected region if said second selected region is determined to be more reliable than said first selected region.

2. The method of claim 1, including the steps of:

establishing an eye model defining image characteristics of the subject's eye and a non-eye model defining image characteristics of facial features other than the subject's eye;

computing deviations of the extracted search window patch from said eye model and said non-eye model; and determining that the extracted search window patch has the appearance of an eye when the deviation of the extracted search window patch from the non-eye model is greater than the deviation of the the extracted search window patch from the eye model.

3. The method of claim 1, including the steps of:

establishing an eye model defining image characteristics of the subject's eye and a non-eye model defining image characteristics of facial features other than the subject's eye;

computing deviations of the extracted search window patch from said eye model and said non-eye model; and determining that the extracted search window patch does not have the appearance of an eye when the deviation of the extracted search window patch from the eye model is greater than the deviation of the extracted search window patch from the non-eye model.

4. The method of claim 1, including the step of:

determining that said first selected region is more reliable than said second selected region when the correction value corresponding to said first selected region exceeds a correlation threshold, and the deviation of said second selected region from said eye model is greater than a deviation of the second selected region from said non-eye model.

5. The method of claim 1, including the step of:

determining that said second selected region is more reliable than said first selected region when the correction value corresponding to said first selected region is less than a correlation threshold, and the deviation of said second selected region from said eye model is less than a deviation of the second selected region from said non-eye model.

6. The method of claim 1, including the steps of:

computing a first variance of search window patches surrounding a center of the first selected region, and a second variance of search window patches surrounding a center of the second selected region;

determining that said first selected region is more reliable than said second selected region when the first variance exceeds the second variance; and determining that said second selected region is more reliable than said first selected region when the second variance exceeds the first variance.

\* \* \* \* \*